Feb. 17, 1970 G. W. ILES 3,495,618
FLOAT VALVES

Filed Nov. 24, 1967

INVENTOR
G. W. ILES

ATTORNEYS

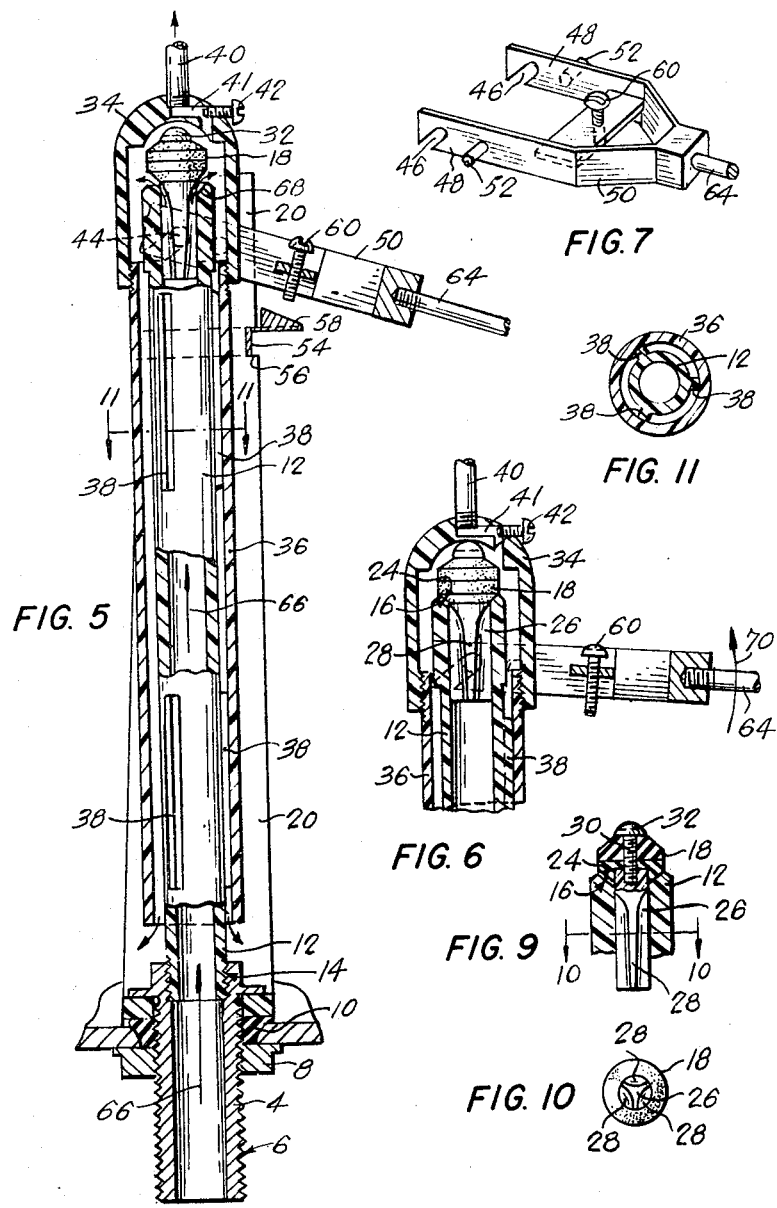

United States Patent Office 3,495,618
Patented Feb. 17, 1970

3,495,618
FLOAT VALVES
George W. Iles, late of 677 Gerald St., Ville Lasalle, Quebec, Canada, by Geraldine Mary O'Sullivan Iles, widow, legatee and sole executrix of the Last Will and Testament of said George W. Iles, deceased
Filed Nov. 24, 1967, Ser. No. 685,548
Claims priority, application Canada, Dec. 1, 1966, 976,933
Int. Cl. F16k 31/18, 47/00
U.S. Cl. 137—437                    9 Claims

ABSTRACT OF THE DISCLOSURE

A float controlled valve assembly including a water inlet pipe open at its top end and bevelled to form a valve seat. A valve seated in the valve seat, an outer pipe concentric with the water pipe, the outer pipe being closed at its top end and open at its lower end, the outer pipe being removably attached to a float operated arm to close the valve when the float is raised and to permit water pressure to open the valve when the float is lowered. The outer pipe being readily removable to permit access to the valve for maintenance or replacement.

---

The present invention relates to a valve and particularly to a float controlled valve assembly.

The float controlled valve assembly of the present invention is particularly adaptable for use as a filling water shut-off valve in water reservoir type toilets, although other applications are of course possible. The present assembly has particular application in toilet reservoir tanks of the modern low configuration.

One of the objects of the invention is to provide a valve for domestic toilet reservoir assemblies which may quickly and easily be replaced as it becomes worn without tools. In known valve arrangements the dismantling to replace worn valve parts is not an easy task and tools not usually found in the average house are necessary for the job.

It is a further object to provide a valve arrangement which is economical but durable in construction and quiet in operation and which may be dismantled to replace worn components and reassembled without the necessity of employing tools.

The particular valve arrangement of the present invention may be constructed of lightweight nylon or rubber parts thus permitting quiet operation and the elimination of corrosion problems.

It is a still further object to provide a filling water shut-off valve for use in water reservoirs and having a toilet bowl refill tube with flow regulating means and a float and float arm also having adjusting means.

These and other objects will become apparent from the following description in conjunction with the accompanying drawings wherein:

FIGURE 5 is a front view similar to FIGURE 1 but showing the component operational parts of the arrangement in sectional view and the valve in open position;

FIGURE 6 is an enlarged front sectional view of the upper section of FIGURE 5 showing the seating of the valve core in closed position;

FIGURE 7 is an enlarged perspective view of the pivoted valve opening yoke shown in all of the preceding figures;

FIGURE 9 is a side partially sectioned view of the valve core;

FIGURE 10 is a sectional view along line 10—10 of FIGURE 8; and

FIGURE 11 is a sectional view along lines 11—11 of FIGURE 5.

Figure 2:
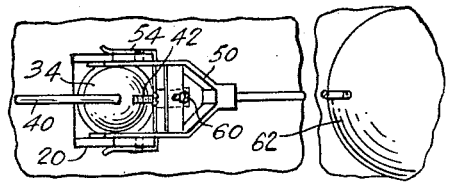
FIGURE 2 shows the valve assembly of FIGURE 1 in top or plan view.

In the drawings a portion of a toilet reservoir tank is shown at 2, and numeral 4 designates a coupling member for attachment, as by threading 6 (see FIGURE 5), to a pipe (not shown) for conducting water under pressure into the reservoir. The coupling member 4 is secured within a hole provided in the bottom of the reservoir by means of a nut 8 and the installation is made watertight by the provision of washer 10.

A water inlet pipe 12 is attached to the coupling 4 as by threads 14 (see FIGURE 5) and projects upwardly into the reservoir as shown. The upper end of the inlet pipe 12 is bevelled inwardly at 16 (see FIGURE 6) to provide a seat for the valve member 18 which will be described in more detail later.

Figure 3:
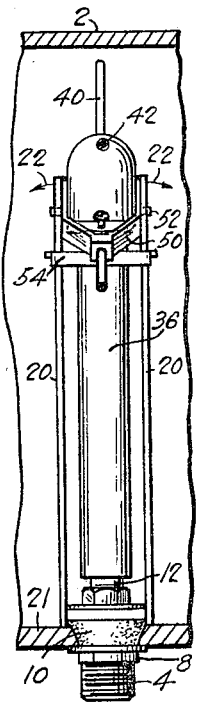
FIGURE 3 is a side view of the valve arrangement taken generally along line 3—3 of FIGURE 1.

Projecting upwardly on each side of the inlet pipe 12 are two flattened bracket members 20 which extend to substantially the same height as the inlet pipe 12. The upper ends of the brackets 20 are moveable outwardly away from the inlet pipe 12 as shown by arrows 22 in FIGURE 3 to a limited degree.

As explained above the upper end of water inlet pipe 12 is bevelled inwardly at 16 to provide a seat for the valve member 18 which is shown in side partial section view in FIGURE 9 positioned in closed position in the upper end of the inlet pipe 12. The valve member is provided with bevelled shoulders 24 to bear against bevelled seat 16. The valve in the drawings is provided with a downwardly projecting tail 26 which is generally triangular in section and with three bearing surfaces 28 (see also FIGURE 10) to maintain correct alignment within the pipe 12. The tail 26 of the valve is received within the pipe to close tolerances but free axial movement of the valve with respect to the pipe is possible to enable the opening and shutting of the valve. In the drawings the components of the valve are secured together by screw 30 having a head 32, but the valve could be molded as one integral piece if desired. In the following disclosure and accompanying claims the valve member 18 may at times be referred to as being a floating valve; not in the sense that it must necessarily float on the surface of a liquid but that it is not attached or otherwise affixed to any other component part.

Positioned over the water pipe 12 and valve 18 is a hollow cap 34 having affixed thereto a downwardly depending cylindrical skirt 36. The cap and skirt are positioned over the pipe 12 but within the brackets 20. The cap and skirt are freely moveable axially with respect to the water pipe and downward movement of the cap will cause the cap to bear against the head 32 of screw 30 to close the valve 18 tightly against seat 16 in pipe 12.

Figure 4:
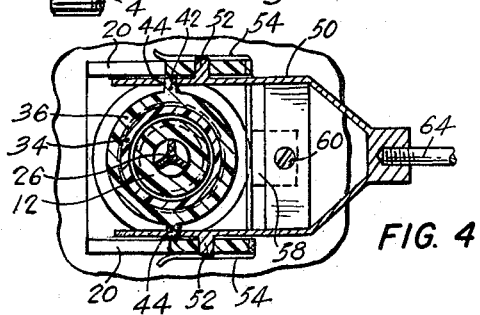
FIGURE 4 is a sectional view taken along line 4—4 of FIGURE 1.

In order to ensure proper axial movement of the cap and skirt with respect to the pipe 12, the exterior of the pipe 12 may be provided with longitudinal ridges 38 (FIGURES 4, 5 and 11) to bear against the interior surfaces of skirt 36.

The cap is provided with a toilet bowl refill tube 40 and a refill tube set-screw 42 to allow adjustment of water flow through pipe 40 and hence to the toilet bowl in known manner as will be explained in more detail hereafter. The cap 34 is also provided with two oppositely projecting pins 44 projecting outwardly toward the brackets 20.

The two pins 44 are provided to engage in the obliquely angled downwardly opening slots 46 provided in the ends of the arms 48 of the generally U-shaped yoke 50 shown in perspective view in FIGURE 7. The arms 48 are also provided with outwardly projecting pins 52 which are received within holes (not numbered) provided in the brackets near their upper ends. When assembled with the yoke straddling the cap the pins 52 on the yoke 50 fit into the holes provided in the brackets 20 (thus the yoke is pivotally supported by the brackets) and the pins 44 on the cap fit within the oblique slots 46 provided in the yoke arms.

Figure 8:
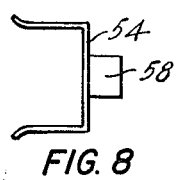
FIGURE 8 is a top view of a clip for securing the side brackets and is shown in preceding FIGURES 1 to 6 inclusive.

The brackets 20 are moveable outwardly to a limited extent (see arrows 22 in FIGURE 3) to permit the pivotal mounting of the yoke between the brackets. After positioning of the yoke between the brackets the brackets are prevented from any outward movement which could accidentally dislodge the yoke, by the provision of a generally horizontally positioned U-shaped clip 54 (see FIGURE 8) which snugly straddles the brackets 20. The edges of the brackets 20 are indented or notched as at 56 (see FIGURE 5) to hold the clip 54 in position and prevent vertical displacement.

The clip in addition to holding the two brackets together also is provided with a set-screw bearing surface 58 against which a set-screw 60 carried by yoke 50 will bear to provide for regulation of the pivoting action of yoke 50 and the lowermost position of the float.

A ball float 62 is carried by rod 64 which is securely attached to the yoke 50, and it will be appreciated that pivoting of the yoke will be controlled by the position of the float which floats upon the surface of the water in the reservoir.

The operation of the valve will now be described.

In view of the connection of inlet pipe 12 with main line water pressure there is always water pressure in pipe 12, and flow of water from pipe 12 into the reservoir will be controlled by valve 18. The pressure of water in pipe 12 will tend to raise valve 18 from its seat 16. The valve however when the reservoir is filled to the desired level will be held in contact with pipe 12 thus preventing water flow into the reservoir by a downward force of the interior of cap 34 against the screw head 32 of valve 18 (see FIGURE 9).

Figure 1:
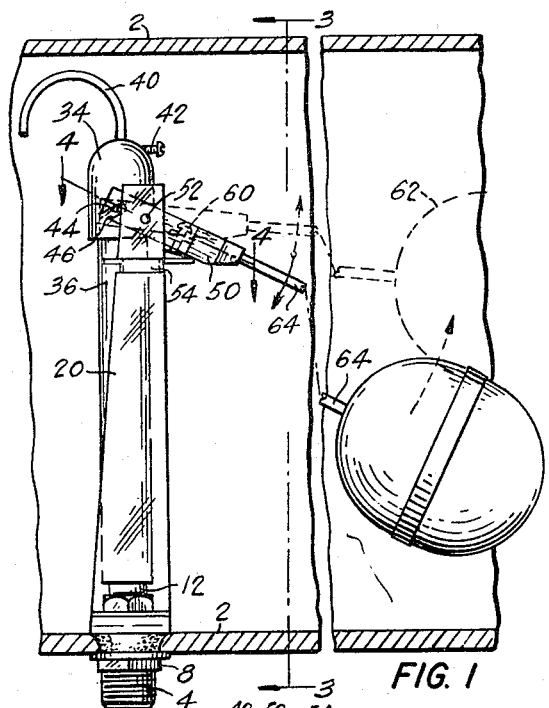
FIGURE 1 illustrates the valve arrangement in front view and partially in section.

When there is no water in the reservoir tank as shown by the positioning of float 62 in full lines in FIGURE 1, the yoke will pivot on pins in the holes of brackets 20 to raise the cap 34 (and skirt 36) from contact with valve 18 due to the action of slots 46 in yoke 50 on pins 44 carried by the cap 34. The release of downward pressure on valve 18 will result in water pressure in pipe 12 lifting valve 18 to permit water to flow into cap 34 and down between the exterior of pipe 12 and the interior of skirt 36 to fill the reservoir. The direction of water flow in pipe 12 is shown by arrows 66 in FIGURE 1, and the flow of water past the valve and into the cap and down the skirt and into the reservoir by arrows 68. The opening of valve 18 and flow of water into the cap 18 will of course result in a flow of water through aperture opening 41 provided in cap 34 and out toilet bowl refill tube 40. By adjusting screw 42 it is of course possible to control the flow through tube 40 to ensure that the bowl is filled to the desired level when the reservoir is filled to the desired level when the valve shuts.

As the water in the reservoir tank rises the float 62 also rises thus causing pivoting of the yoke 50 as shown by arrow 70 in FIGURE 6 and the action of the yoke arms against the pins 44 carried by the cap will urge the cap 34 and hence valve 18 toward the seat 16 and closing of the valve. As the water in the reservoir reaches its desired capacity the float 62 will be in a position somewhat as shown in broken lines in FIGURE 1 and the pivoting of yoke 50 will result in the movement of valve 18 into snug contact with seat 16 to stop further water flow into the reservoir tank.

Upon flushing of the toilet and rapid exit of the water from the reservoir tank, the float will of course drop and raise cap 34 from contact with valve 18 to permit water pressure in pipe 12 opening the valve and filling the tank.

The purpose of set-screw 60 on yoke 50 and surface 58 on the clip 54 is as explained above to limit the downward pivoting of the yoke and the lowermost limit of float 62; and the toilet bowl refill tube set-screw 42 is provided to ensure that the bowl will be filled to the desired level when the tank is filled to the desired level and the valve 18 is closed. This is accomplished by adjusting the screw 10 to regulate the flow of water through the refill tube 40.

The valve 18 or other component parts may when worn be quickly and easily replaced without tools by simply removing clip 56 to permit some outward movement in brackets 20. The yoke 50 and float 62 are then disengaged from the brackets and cap 34, and the cap 34 and skirt 36 removed for easy access to valve 18. The valve may then be replaced and the assembly re-assembled in the reverse order of the steps outlined above.

In the foregoing description and accompanying drawings the valve seat 16 is shown as being integral with the top of inlet pipe 12. However the seat 16 may be formed in a short piece (not shown) which threadedly connects to the top end of the pipe 12, to enable replacement of the valve seat without having to replace the whole of pipe 12.

The components of the assembly may be made of nylon, plastic or bronze and the like for quiet operation and non-corrosion.

As the valve member 18 seats freely on the valve seat 16 it automatically acts as a backflow preventer, preventing contaminated water in the tank from being syphoned up through the cylindrical skirt 36 back into the main supply pipe 6. This is of particular importance where no provision is made to drain the tank when repairs are being made.

What I claim is:

1. Valve assembly comprising an upright water pipe open and bevelled inwardly at its upper end to provide a valve seat, the lower end of said pipe being connected to a supply of water pressure, a floating valve having surfaces to bear against the seat positioned in the upper end of the inlet pipe, and a hollow cap having a downwardly depending cylindrical skirt positioned over the pipe and valve and axially moveable with respect thereto, the top inner surface of the cap contacting the valve and closing same against the seat when the cap is in its lowermost position, and a pivotally mounted U-shaped yoke having arms straddling the cap and connected thereto and a float rod extending from the yoke and a float secured to the other end of the float rod, whereby lowering of the float results in a pivoting of the yoke and a lifting of the cap to permit water pressure in the inlet pipe to lift the valve from the seat.

2. Valve assembly according to claim 1 further comprising an upright bracket member positioned on each side of the inlet pipe, each bracket being provided with a hole near its upper end to receive an outwardly projecting pin provided on each arm of the yoke, whereby enabling pivoting of the yoke.

3. Valve assembly according to claim 2 wherein the cap is provided with two oppositely positioned outwardly projecting pins, and each arm of the yoke is provided with an obliquely angled downwardly opening slot to receive one of the pins projecting from the cap.

4. Valve assembly according to claim 3 wherein the upper ends of the brackets are moveable outwardly to a limited degree to enable positioning of the pins on the yoke in the holes of the brackets, and a substantially horizontally positioned removeable U-shaped clip snugly straddling the brackets beneath the yoke to prevent outward movement of the upper ends of the brackets after positioning of the yoke therebetween.

5. Valve assembly according to claim 4 wherein the edges of the brackets are notched to receive the clip and prevent vertical displacement thereof.

6. Valve assembly according to claim 5 wherein the clip is provided with a set-screw bearing surface, and the yoke is provided with a set-screw to provide for regulation of the pivoting of the yoke and the lowermost position of the float.

7. Valve assembly according to claim 1 wherein the cap is provided with an aperture and connecting toilet bowl refill tube and set-screw means operable in the aperture to control water flow through the aperture and tube.

8. Valve assembly according to claim 1 wherein the floating valve has a tail projecting downwardly into the inlet pipe, said tail being generally triangular in cross-section.

9. Valve assembly according to claim 1 wherein the exterior surface of the inlet tube is provided with longitudinal ridges to bear against the interior surface of the skirt to maintain the cap and skirt in axial alignment with the inlet pipe.

References Cited

UNITED STATES PATENTS

| | | | |
|---|---|---|---|
| 1,497,796 | 6/1924 | Sherwood | 137—444 X |
| 2,989,071 | 6/1961 | Fulton et al. | 137—437 |

FOREIGN PATENTS

| | | |
|---|---|---|
| 598,634 | 10/1925 | France. |
| 866,677 | 4/1961 | Great Britain. |

WILLIAM F. O'DEA, Primary Examiner

DAVID R. MATTHEWS, Assistant Examiner

U.S. Cl. X. R.

251—121